SEARCH ROOM 3,639,697

Feb. 1, 1972

[54] MAGNETIC TAPE CA CONTAINING ENGAGING MEANS FOR ROTARY HEAD

[72] Inventors: Kazumasa Koguma, Tokyo, Hiroshi Takeuchi, Kanagawa-ken; Yuichi Kanamaru, Saitama-ken, all of Japan

[73] Assignee: Sony Corporation, Tokyo, Japan

[22] Filed: Feb. 16, 1970

[21] Appl. No.: 11,750

[30] Foreign Application Priority Data

Feb. 28, 1969 Japan....................................44/15781
Apr. 23, 1969 Japan....................................44/31402

[52] U.S. Cl. ........................................179/100.2 Z, 274/4 C
[51] Int. Cl. ........................................................G11b 23/04
[58] Field of Search ..............179/100.2 Z, 100.2 T; 274/4 C, 274/4 D, 4 E, 11 C, 11 D, 11 E; 242/55, 19 A, 197, 199, 200

[56] References Cited

UNITED STATES PATENTS 3,510,605 5/1970 Ottens............................179/100.2 Z

..............179/100.2 Z

OTHER PUBLICATIONS

IBM Technical Disclosure Bulletin, Automatic Tape Threading, R. B. Johnson et al., Vol. 9 No. 8 Jan. 1967, page 968

*Primary Examiner*—Bernard Konick
*Assistant Examiner*—Alfred H. Eddleman
*Attorney*—Lewis H. Eslinger, Alvin Sinderbrand and Curtis, Morris and Safford

[57] ABSTRACT

A magnetic tape recording and reproducing device having a tape guide drum and a rotary magnetic head for recording and reproducing signals on a tape wrapped about the drum is provided with a magnetic tape cartridge adapted to be removably mounted on the device and having a housing containing the tape and an assembly by which, when the cartridge is removed from the device, a loop of the tape is securely supported and, when the cartridge is mounted on the device, such tape loop is released to engage in wrapped relation about the guide drum for recording or reproducing operations.

22 Claims, 16 Drawing Figures

INVENTORS
KAZUMASA KOGUMA
HIROSHI TAKEUCHI
YUICHI KANAMARU
BY
ATTORNEY

BEST AVAILABLE COPY

INVENTORS
KAZUMASA KOGUMA
HIROSHI TAKEUCHI
YUICHI KANAMARU
BY
Louis A. Caligian
ATTORNEY

BEST AVAILABLE COPY

INVENTORS
KAZUMASA KOGUMA
HIROSHI TAKEUCHI
YUICHI KANAMARU

BY

ATTORNEY

BEST AVAILABLE COPY

INVENTORS
KAZUMASA KOGUMA
HIROSHI TAKEUCHI
YUICHI KANAMARU
BY
[signature]
ATTORNEY

BEST AVAILABLE COPY

INVENTORS
KAZUMASA KOGUMA
HIROSHI TAKEUCHI
YUICHI KANAMARU
BY
ATTORNEY

BEST AVAILABLE COPY

INVENTORS
KAZUMASA KOGUMA
HIROSHI TAKEUCHI
YUICHI KANAMARU
BY
[signature]
ATTORNEY

BEST AVAILABLE COPY

INVENTORS
KAZUMASA KOGUMA
HIROSHI TAKEUCHI
YUICHI KANAMARU
BY
ATTORNEY

MAGNETIC TAPE CARTRIDGE CONTAINING ENGAGING MEANS FOR ROTARY HEAD

This invention relates generally to magnetic tape recording and reproducing apparatus, and more particularly is directed to such apparatus of the type in which a rotary magnetic head is provided for recording and reproducing signals on the tape which is wrapped about a tape guide drum coaxial with the axis of rotation of the head.

In magnetic tape recording and reproducing apparatus of the above described type, for example, video tape recorders, the magnetic tape travels between a supply reel and a takeup reel which are rotatably mounted on the deck or panel of the apparatus. In existing video tape recorders, the tape is usually threaded manually from the supply reel past various tape guides and wrapped about the guide drum prior being led to the takeup reel onto which the tape is wound during the recording or reproducing operations. Such manual threading of the tape is laborious and time consuming, particularly when frequent changes of the tape are required. Further, whenever a particular tape is to be replaced, all of the tape must be returned to the supply reel to permit withdrawal of the tape from its wrapped engagement with the guide drum. It will also be apparent that, with the existing arrangement as described, the supply reels having tapes wound thereon which are not in use should be stored in suitable containers for protection of the tapes, and that the mounting of a supply reel on the video tape recorder thus required the removal of the supply reel from its protective container.

Although various magnetic tape cartridges have been devised for use with audio tape recorders in which the tape is merely moved past a stationary recording and reproducing head during operation of the recorder, whereby to facilitate the exchanging of tapes and to avoid the necessity for manual threading of the tape prior to the commencement of recording or reproducing operations, similar magnetic tape cartridges have not been heretofore developed for use with video tape recorders or other magnetic recording an reproducing apparatus having a rotary magnetic head by reason of the difficulty of achieving the necessary wrapped engagement of the tape with the tape guide drum when the tape is contained in a cartridge.

Accordingly, it is an object of this invention to provide a magnetic tape cartridge for use with video tape recorders or other magnetic recording and reproducing apparatus of the type provided with a rotary magnetic head.

Another object is to provide a magnetic tape cartridge, as aforesaid, and further to provide mechanisms by which the tape contained in the cartridge may be conveniently wrapped about the tape guide drum or removed therefrom.

A further object is to provide a magnetic tape cartridge for use with magnetic recording and reproducing apparatus of the described type, and in which the mechanisms for wrapping the tape about the tape guide drum or removing the tape therefrom constitute parts of the tape cartridge and are separable with the latter from the recording and reproducing apparatus.

Still another object is to provide a magnetic tape cartridge, as aforesaid, which is constructed and arranged to protect the tape contained therein from damage either during the mounting or dismounting of the cartridge on the panel or deck of the recording and reproducing apparatus or during transportation or storage of the cartridge.

Still other specific objects of the invention are to provide a magnetic recording and reproducing apparatus and a magnetic tape cartridge therefor which are constructed and arranged to permit operation of the mechanisms for wrapping the tape about the tape guide drum only when the cartridge is mounted on the apparatus and the latter is inoperative or stopped; to permit removal of the cartridge from the apparatus only when the latter is inoperative; and further to prevent rotation of the supply and takeup reels on which the tape is wound within the cartridge housing except when the cartridge is mounted on the recording and reproducing apparatus.

The above, and other objects, features and advantages of this invention, will be apparent in the following detailed description of illustrative embodiments thereof which is to be read in connection with the accompanying drawings, wherein.

Figure 1:
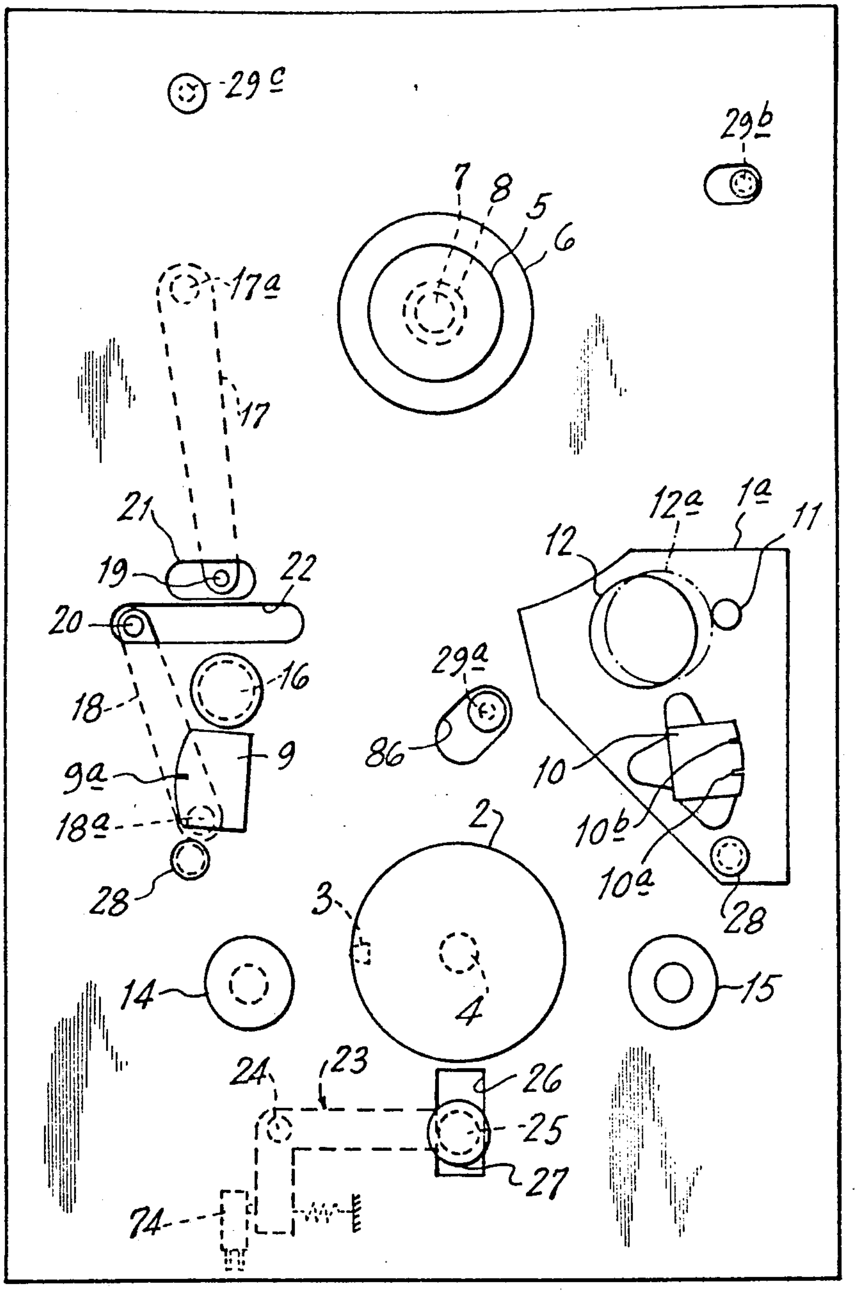
FIG. 1 is a plan view of the deck of a video tape recorder intended to receive a magnetic tape cartridge in accordance with an embodiment of this invention.

Referring to the drawings in detail and initially to FIG. 1 thereof, it will be seen that a video tape recorder intended to receive a magnetic tape cartridge according to this invention is provided with a panel or deck 1 from the forward portion of which there projects a cylindrical tape guide member or drum 2 having a rotary magnetic head 3 extending slightly beyond the surface of the guide drum. The guide drum 2 and rotary magnetic head 3 may rotate as a unit, as on a shaft 4, or the tape guide drum 2 may be fixed relative to panel 1 with only the head 3 being rotated relative thereto. Also projecting from panel 1 at a location spaced rearwardly from tape guide drum 2 are concentric takeup reel and supply reel driving bases 5 and 6, respectively, connected with suitably driven coaxial shafts 7 and 8 extending through deck 1. An erasing head 9 having an air gap 9*a* is mounted on panel 1 at one side of guide drum 2 between the latter and the reel bases 5 and 6, and a sound or audio and control track head 10 having air gaps 10*a* and 10*b* is mounted at the opposite side of guide drum 2 on a subpanel 1*a* which extends above the remainder of deck 1. Also extending from subpanel 1*a* are a rotated capstan 11 and a pinch roller 12 which is suitably movable from its inoperative position shown in full lines on FIG. 1 to its operative position shown in broken lines at 12*a* where the pinch roller engages the capstan 11 so that rotation of the latter will effect movement of the tape engaged therebetween. Oppositely tapered guide pins 14 and 15 extend upwardly from panel 1 at opposite sides of guide drum 2 for guiding a magnetic tape when the latter is wound or wrapped obliquely around the circumferential surface of guide drum 2.

A guide roller 16 is mounted on panel 1 adjacent head 9 for guiding a magnetic tape into engagement with head 9. Levers 17 and 18 are disposed under panel 1 and each pivotally mounted at one end, as at 17*a* and 18*a*, respectively, while the opposite ends of levers 17 and 18 carry guide pins 19 and 20, respectively, which project upwardly through slots 21 and 22 formed in panel 1. Also mounted under panel 1 is a bell crank

BEST AVAILABLE COPY 23 which is pivotally mounted intermediate its ends, as at 24, and carries a roller or pin 25 at one end projecting upwardly through an opening 26 in panel 1 in front of guide drum 2. A flange 27 is provided on the top end of roller or pin 25 for a purpose hereinafter described in detail. A guide pin 28 extends upwardly from subpanel 1a between head 10 and tapered guide pin 15 for guiding the magnetic tape to the surface of head 10. Also extending upwardly from panel 1 are locating pins 29a, 29b and 29c by which a magnetic tape cartridge in accordance with this invention may be located and fixed on the panel 1.

Figure 2:
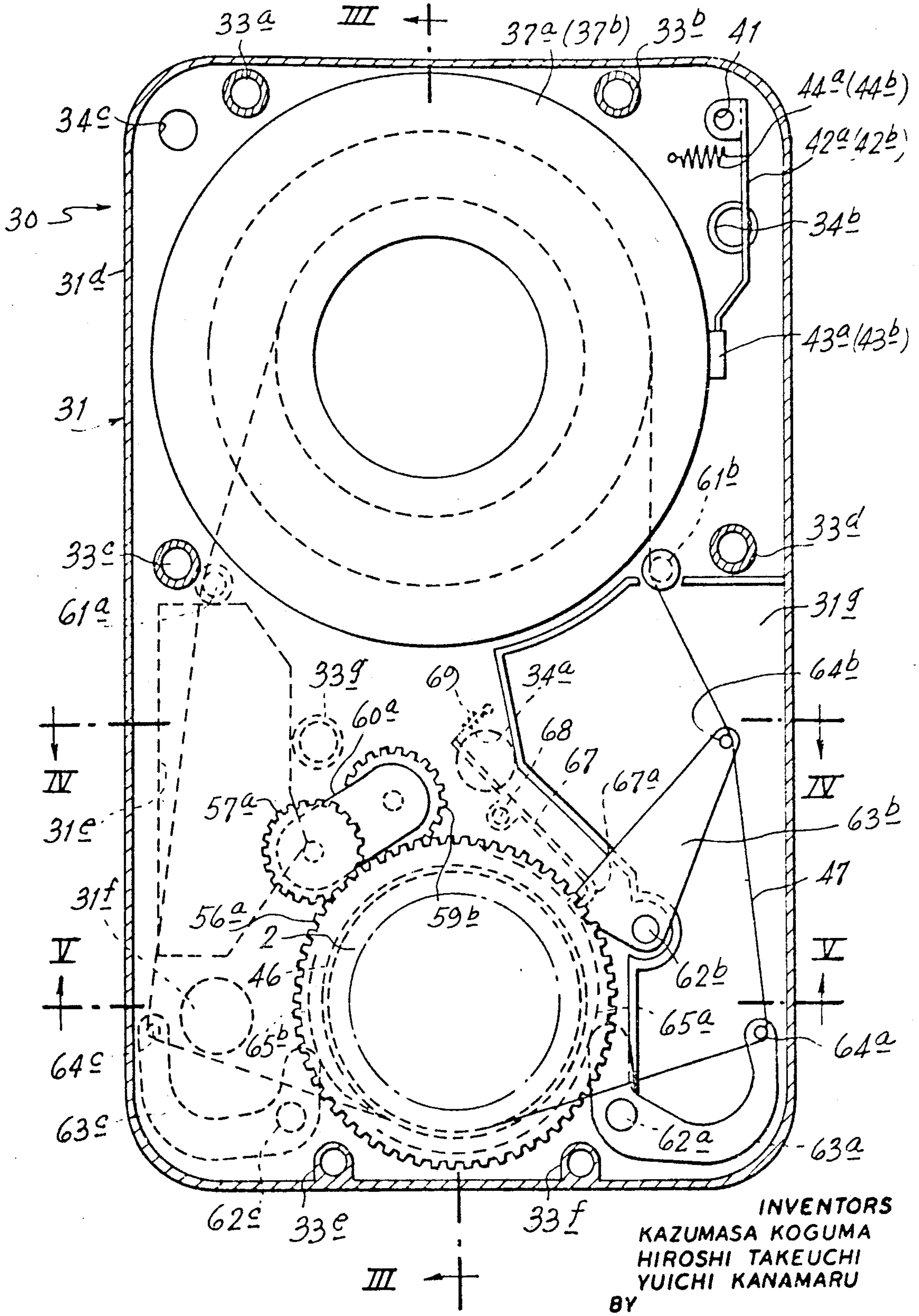
FIG. 2 is a top plan view of a magnetic tape cartridge according to this invention adapted to be removably mounted on the deck of FIG. 1, and which is shown with the top wall of its housing removed for better illustrating the contents thereof.
Figures 3, 12, 13:
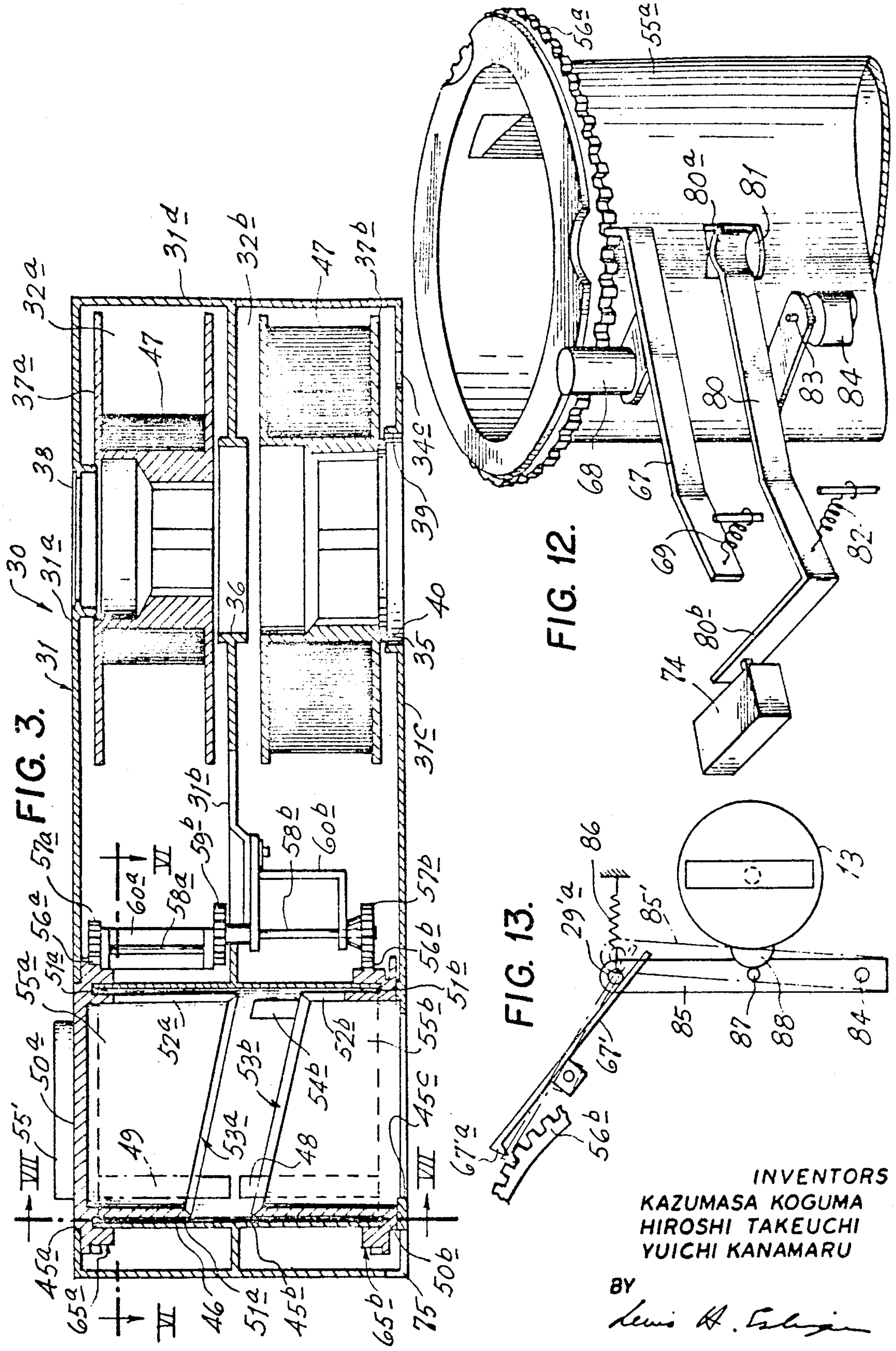
FIG. 3 is a longitudinal sectional view taken along the line III—III on FIG. 2.
FIG. 12 is a schematic perspective view showing the cooperative action of several parts of a magnetic tape cartridge in accordance with another embodiment of the invention.
FIG. 13 is a schematic plan view of a control and mechanism for the video tape recorder.
Figure 4:
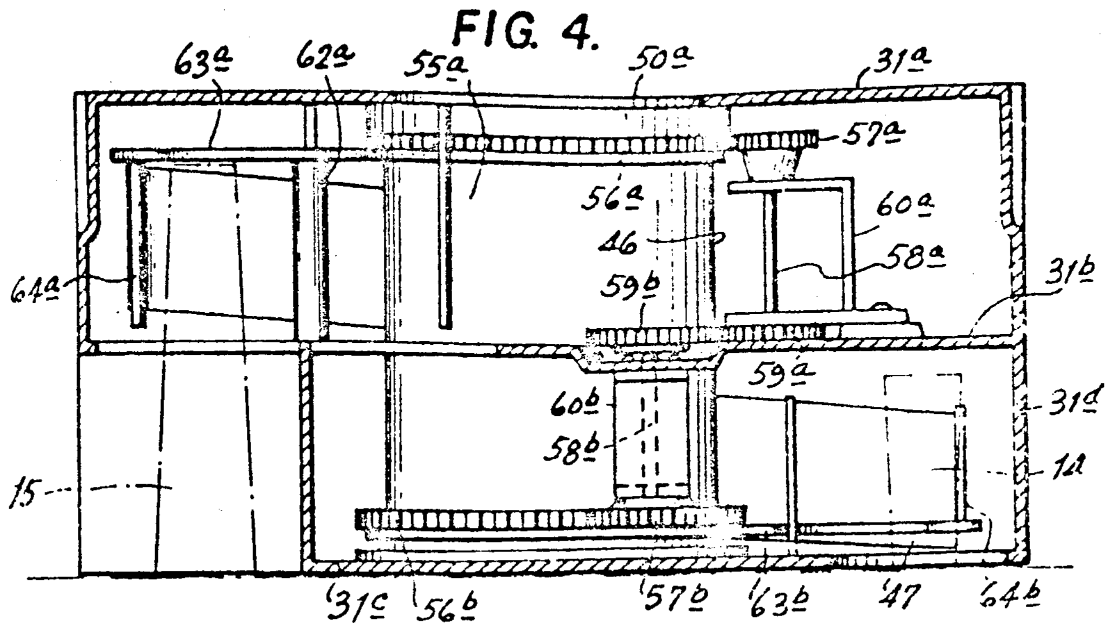
FIGS. 4 and 5 are transverse sectional views respectively taken along the lines IV—IV and V—V on FIG. 2, FIGS. 6A, 6B and 6C are schematic sectional views taken along the line VI—VI on FIG. 3, and which show parts of the cartridge in several different relative positions thereof.

Referring now to FIGS. 2 and 3, it will be seen that a magnetic tape cartridge 30 in accordance with this invention generally comprises a housing 31, for example, of molded plastic, having a top wall or panel 31a (FIG. 3), an intermediate or middle panel 31b located approximately midway between top wall 31a and a bottom wall or panel 31c, and a sidewall 31d extending around the periphery of the housing. Posts 33l–33f may be provided within the housing on intermediate wall 31b to receive screws by which the top and bottom walls 31a and 31c are secured in position. The bottom wall or panel 31c has openings 34a, 34b and 34c for receiving the locating pins 29a, 29b and 29c, respectively, by which the cartridge housing 31 is located and removably fixed to the panel or deck 1. Further, a relatively large circular opening 35 (FIG. 3) is formed in the bottom housing wall 31c to permit the passage therethrough of the supply reel base 6, and an opening 36 is provided in intermediate wall 31b concentric with the opening 35 to permit the passage through opening 36 of the smaller diameter takeup reel base 5 when housing 31 is mounted on panel or deck 1.

As shown particularly on FIG. 3, the intermediate housing wall 31b divides the interior of housing 31 into upper and lower chambers 32a and 32b, respectively, for receiving a takeup reel 37a and a supply reel 37b. The reels 37a and 37b are freely rotatable in the rear portions of the respective chambers and are loosely held therein, as by a circular flange 38 depending from top wall 31a and being engageable in a cylindrical cavity formed at the top of the hub of reel 37a, and by an annular flange 39 projecting upwardly from bottom wall 31c around opening 35 and being loosely engageable with an annular rim 40 depending from the bottom of the hub of reel 37b.

A shaft 41 (FIG. 2) is fixed in intermediate wall 31b and extends above and below the latter. Brake arms 42a and 42b are pivotally mounted on the upper and lower portions of shaft 41 and respectively carry brake shoes 43a and 43b which are urged into braking engagement with the peripheries of the reels 37a and 37b, respectively, as by tension springs 44a and 44b acting on brake arms 42a and 42b. Thus, except when brake arms 42a and 42b are angularly displaced in opposition to the springs 44a and 44b, as hereinafter described, the brake shoes 43a and 43b frictionally engage the peripheries of reels 37a and 37b to hold the latter against rotation.

Aligned circular openings 45a, 45b and 45c (FIG. 3) are provided in housing walls 31a, 31b and 31c, respectively, at locations corresponding to the location of guide drum 2 on the panel or deck 1, and a cylindrical wall 46 extends upwardly and downwardly from intermediate wall 31b around the opening 45b of the latter and terminates, at its upper and lower edges, short of the top and bottom walls 31a and 31c so as to leave small annular gaps therebetween. The inner diameter of cylindrical wall 46 is substantially larger than the diameter of tape guide drum 2 so as to permit the latter to extend freely into cylindrical wall 46 through the bottom opening 45c. Slots 48 and 49 (FIG. 3) are formed in the lower and upper parts, respectively, of the forward portion of cylindrical wall 46 at opposite sides of the center thereof so as to permit the entry and exit of a tape into and out of the space defined within cylindrical wall 46.

Generally cylindrical upper and lower members 55a and 55b extend rotatably within the upper and lower portions, respectively, of cylindrical wall 46 and are diametrically dimensioned to provide an annular clearance between their outer surfaces and the inner surface of wall 46 and also to permit guide drum 2 to extend upwardly, with clearance, into the cavity defined within members 55a and 55b. Upper cylindrical member 55a is closed, at its upper end, by a wall 50a having a circular raised portion engaging rotatably in opening 45a of top wall 31a. Further, wall 50a projects radially outward beyond cylindrical member 55a and has a downwardly opening annular groove 51a outside of member 55a receiving the upper edge portion of cylindrical wall 46 whereby member 55a is precisely located for rotation within the upper portion of cylindrical wall 46. A handle 55' may extend diametrically across the top surface of wall 50a, as shown, to provide means by which member 55a may be manually turned. In order to rotatably mount the lower cylindrical member 55b, the latter may be provided with an outwardly directed flange 50b (FIG. 3) extending from its lower end between bottom wall 31c and the lower edge of cylindrical wall 46, with such flange having an upwardly opening annular groove 51b rotatably locating member 55b relative to the latter.

Cylindrical members 55a and 55b are rotatably coupled for rotation in opposite directions. Such coupling of members 55a and 55b may be effected by providing the latter with peripheral gears 56a and 56b which respectively mesh with pinions 57a and 57b fixed to shafts 58a and 58b with are rotatable in brackets 60a and 60b secured to intermediate wall 31b. The shafts 58a and 58b further have meshing gears 59a and 59b secured thereto, whereby rotation of member 55a is transmitted through the described gears and pinions to member 55b to effect counterrotation of the latter.

Figure 5:
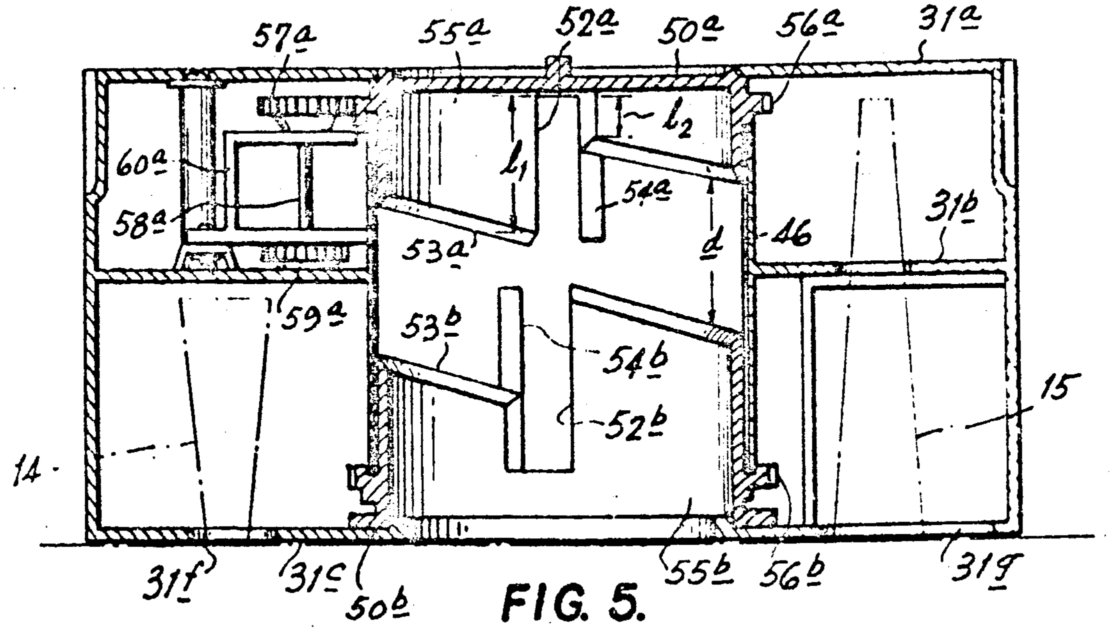
Figure 7:
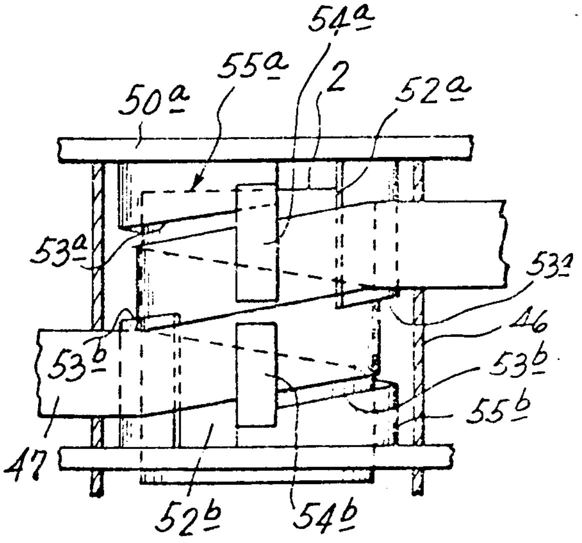
FIG. 7 is a detail sectional view taken along the line VII—VII on FIG. 3.

As shown particularly on FIGS. 3, 5 and 7, cylindrical members 55a and 55b have axial slots 52a and 52b opening at the respective preferably beveled end edges 53a and 53b, which are helical and parallel to each other. Thus, slot 52a has relatively long and short sides $l_1$ and $l_2$ at the opposite sides thereof (FIG. 5), and slot 52b similarly has relatively long and short sides which are in opposing relationship to the long and short sides of slot 52a. Each of slots 52a and 52b is disposed so that the difference between its long and short sides $l_1$ and $l_2$ is the pitch of the helix constituting the end edge 53a or 53b. Guide arms 54a and 54b project axially from cylindrical members 55a and 55b, respectively, as extensions of the relatively short sides of the respective axial slots 52a and 52b and are axially coextensive with the long sides of the respective slots.

The cylindrical members 55a and 55b are counterrotatable through approximately 180° between tape supporting positions (FIGS. 3 and 5) in which slots 52a and 52b face toward the rear of cylindrical wall 46, and tape release positions (FIG. 7) in which slots 52a and 52b fact toward the front of cylindrical wall 42 adjacent slots 48 and 49 in cylindrical wall 46. Further, cylindrical members 55a and 55b are axially dimensioned so that, in all of the rotary positions thereof, the axial distance $d$ (FIG. 5) between their end edges 53a and 53b is substantially less than the width of the tape 47 which is to be guided between the takeup and supply reels 37a and 37b.

When the cartridge 30 is not in use or is being mounted on, or removed from deck 1 of a video tape recorder, cylindrical members 55a and 55b are disposed in their tape supporting positions (FIGS. 3 and 5). The tape 47 wound on supply reel 37b in the lower compartment 32b extends forwardly from supply reel 37b past a guide pin 61a and then into cylindrical wall 46 through the entrance slot 48 at one side of the front thereof. Within cylindrical wall 46, the tape forms one helical turn or loop, whereupon the tape is withdrawn through the exit slot 49 and then led past a guide pin 61b back to the takeup reel 37a in the upper compartment 32a. The helical edges 53a and 53b of members 55a and 55b extend generally parallel to the helical turn or loop of tape 47 within cylindrical wall 46 and, with members 55a and 55b in their tape supporting positions, the helical turn or loop of the tape is disposed in the gap or radial clearance between members 55a and 55b and the inner surface of wall 46. Thus, the tape loop is radially outwardly supported by members 55a and 55b with the exception that, at the rear portion of wall 46, the tape passes radially inward with respect to guide arms 54a and 54b and travels through slots 52a and 52b, prior to passing radially outward over the long sides $l_1$ of such slots, for example, as shown diagrammatically on FIG. 6A with respect to the member 55a. Thus, so long as members 55a and 55b are in their tape supporting positions, the helical turn or loop of the tape within wall 46 is securely retained by members 55a and 55b against the inner surface of wall 46 in the annular gap or clearance defined between that inner surface and the outer surfaces of members 55a and 55b. Accordingly, when the cartridge is not in use, members 55a and 55b in their tape supporting positions ensure that the helical turn or loop of the tape will be maintained and prevented from falling out of opening 45c. Further, when mounting the cartridge 30 on deck 1 or removing the cartridge therefrom, the tape loop will be safely held by members 55a and 55b out of contact with the tape guiding drum 2 which is either being inserted in or removed from, respectively, the cylindrical cavity defined within members 55a and 55b.

Figure 6A:
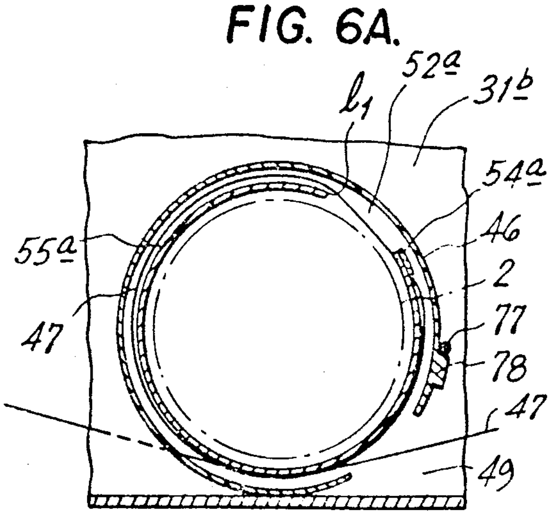
Figure 6B:
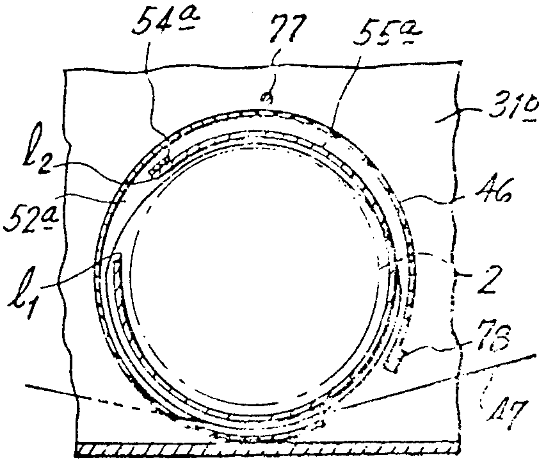
Figure 6C:
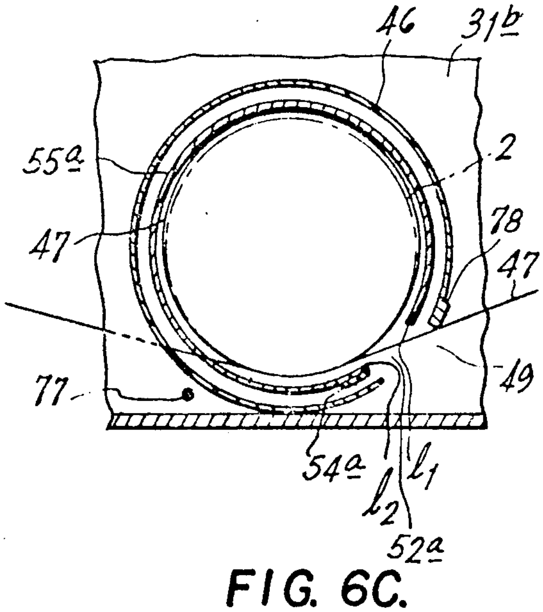

However, when cartridge 30 has been mounted on deck 1 so that the tape guiding drum 2 extends upwardly within the cavity defined by members 55a and 55b, the turning of cylindrical member 55a in the counterclockwise direction, that is, in the direction of forward travel of the tape to exit slot 49, from the tape supporting position shown on FIG. 6A through the intermediate position shown on FIG. 6B to the tape releasing position shown on FIG. 6C, and the corresponding clockwise rotation of the member 55b to its tape releasing position, will cause the helical turn or loop of the tape 47 to be disposed radially inward with respect to the members 55a and 55b and to pass through slots 52a and 52b of the latter to slots 49 and 48, respectively of wall so as to be wound or wrapped about the tape guiding drum 2. Such action of members 55a and 55b is ensured by the guide arms 54a and 54b thereon. With the tape thus wrapped or wound about drum 2, the video tape recorder can be operated in the usual manner so as to cause its rotated head 3 to magnetically record or reproduce signals on the tape while the latter is advanced around the drum 2 by the driving action of capstan 11.

When it is desired to remove cartridge 30 from the deck 1 of the video tape recorder, member 55a is turned in the clockwise direction through approximately 180° from its tape releasing position shown on FIG. 6C to its tape supporting position shown in FIG. 6A, and member 55b is similarly turned, but in the counterclockwise direction. During such rotary movements of members 55a and 55b, the relatively long sides $l_1$ of slots 52a and 52b act against the tape, for example, as shown on FIG. 6B with respect to the member 55a, so as to radially outwardly strip the tape from the surface of drum 2, and finally to again dispose the tape in the annular clearance between the inner surface of cylindrical wall 46 and the outer surfaces of members 55a and 55b, whereby the tape loop or helical turn is freed of drum 2 to permit withdrawal of the latter from within members 55a and 55b.

As shown in broken lines on FIG. 2, one side portion of bottom wall 31c of housing 31 has an elongated opening 31e therein through which the head 9, guide roller 16 and guide pins 19 and 20 can extend upwardly into lower compartment 32b when the housing is mounted on deck or panel 1, and bottom wall 31c further has an opening 31f dimensioned and located to permit the upward extension therethrough of the tapered guide 14 (FIG. 5). At the opposite side portion of housing 31, the intermediate wall 31b and the bottom wall 31c are cut away, as at 31g, so as to receive the subpanel 1a and permit head 10, capstan 11, pinch roller 12, guide pin 28 and tapered guide roller 15 to project into upper chamber 32a when cartridge 30 is mounted on deck or panel 1.

Figure 8:
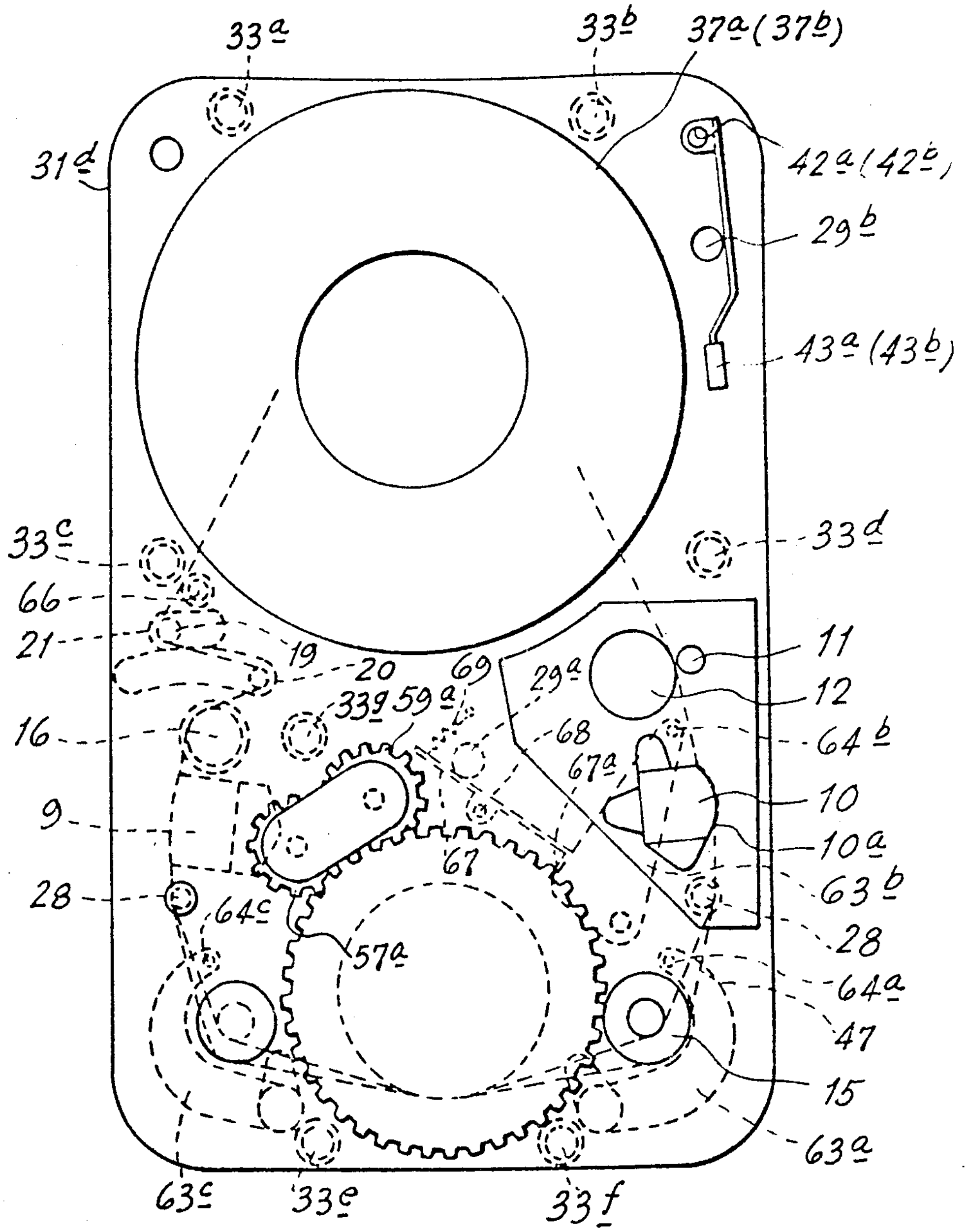
FIG. 8 is a view generally similar to that of FIG. 2, but illustrating the magnetic tape cartridge mounted on the deck of FIG. 1.

In order to ensure that tape 47 will be spaced from heads 9 and 10 during the mounting of cartridge 30 on deck 1 and also during the removal of the cartridge from the deck, the cartridge 30 further preferably includes lever arms 63a, 63b and 63c respectively pivotally mounted on pins 62a, 62b and 62c which extend from intermediate wall 31b. Arms 63a and 63b carry guide pins 64a and 64b at one end which are engageable laterally outward against the run of tape 47 extending within upper compartment 32a between exit slot 49 of cylindrical wall 46 and guide pin 61b, and lever 63c similarly carries a guide pin 64c at one end which is engageable laterally outward against the run of the tape 47 extending within the lower compartment 32b between guide pin 61a and entrance slot 48 of wall 46. The arms 63a and 63b are further engageable with a peripheral cam surface 65a provided on cylindrical member 55a, while arm 63c is similarly engaged with a cam surface 65b provided on the periphery of cylindrical member 55b. The cam surfaces 65a and 65b are shaped so that, when members 55a and 55b are in their tape supporting positions, as during mounting or removal of cartridge 30 with respect to deck or panel 1, pins 64a, 64b and 64c are displaced laterally outward to the positions shown on FIG. 2 and thus cause the engaged runs of tape 47 to be spaced laterally outward from the operative surfaces of the heads 9 and 10. However, when cartridge 30 is mounted on deck 1 and members 55a and 55b are turned to their tape releasing positions so as to permit engagement of the tape loop with tape guiding drum 2, as in preparation for operation of the video tape recorder, cams 65a and 65b permit arms 63a, 63b and 63c to be angularly displaced, for example, as by springs (not shown), to the positions shown in broken lines on FIG. 8, whereby the respective guide pins 64a, 64b and 64c are withdrawn laterally inward from contact with the tape leaving the latter free to engage heads 9 and 10, and also to engage the tapered guide rollers 14 and 15 and the guide pins 28 extending from deck 1.

In order to ensure that members 55a and 55b will remain in their tape supporting positions when cartridge 30 is removed from deck or panel 1, the cartridge is further provided with a locking level 67 (shown in broken lines on FIGS. 2 and 8) which is pivotally mounted, intermediate its ends, on a pivot pin depending from intermediate wall 31b adjacent opening 34a in bottom wall 31c. One end of locking lever 67 is bent to form a pawl 67a which is urged into engagement with gear 56b on the periphery of member 55b, as by a spring 69 connected to the opposite end portion of lever 67. When pawl 67a engages gear 56b, to lock members 55a and 55b against rotation from their tape supporting positions, the opposite end portion of lever 67 extends over the opening 34a, as shown on FIG. 2. However, when cartridge 30 is mounted on deck or panel 1, the locating pin 29a extending into opening 34a engages lever 67 and rocks the latter to the position shown on FIG. 8 where pawl 67a is released from the teeth of the respective gear 56b and thus frees members 55a and 55b for the turning thereof to their tape releasing positions.

As is shown on FIG. 2, brake arms 42a and 42b, when positioned to engage the respective reels 37a and 37b for preventing rotation of the latter, extend partly across the opening 34b provided in the bottom wall of housing 31 and across an aligned opening in intermediate wall 31b. Thus, when cartridge 30 is mounted on deck 1, the locating pin 29b extending through opening 34b in bottom wall 31c and also through the aligned opening in the intermediate wall engages brake arms 42a and 42b to rock the latter in the directions opposed to the action of springs 44a and 44b whereby to disengage brake shoes 43a and 43b from reels 37a and 37b, as shown on FIG. 8, so that, with the cartridge mounted on deck 1, the supply and takeup reels are free to be rotated.

Figures 9, 10, 11A, 11B:
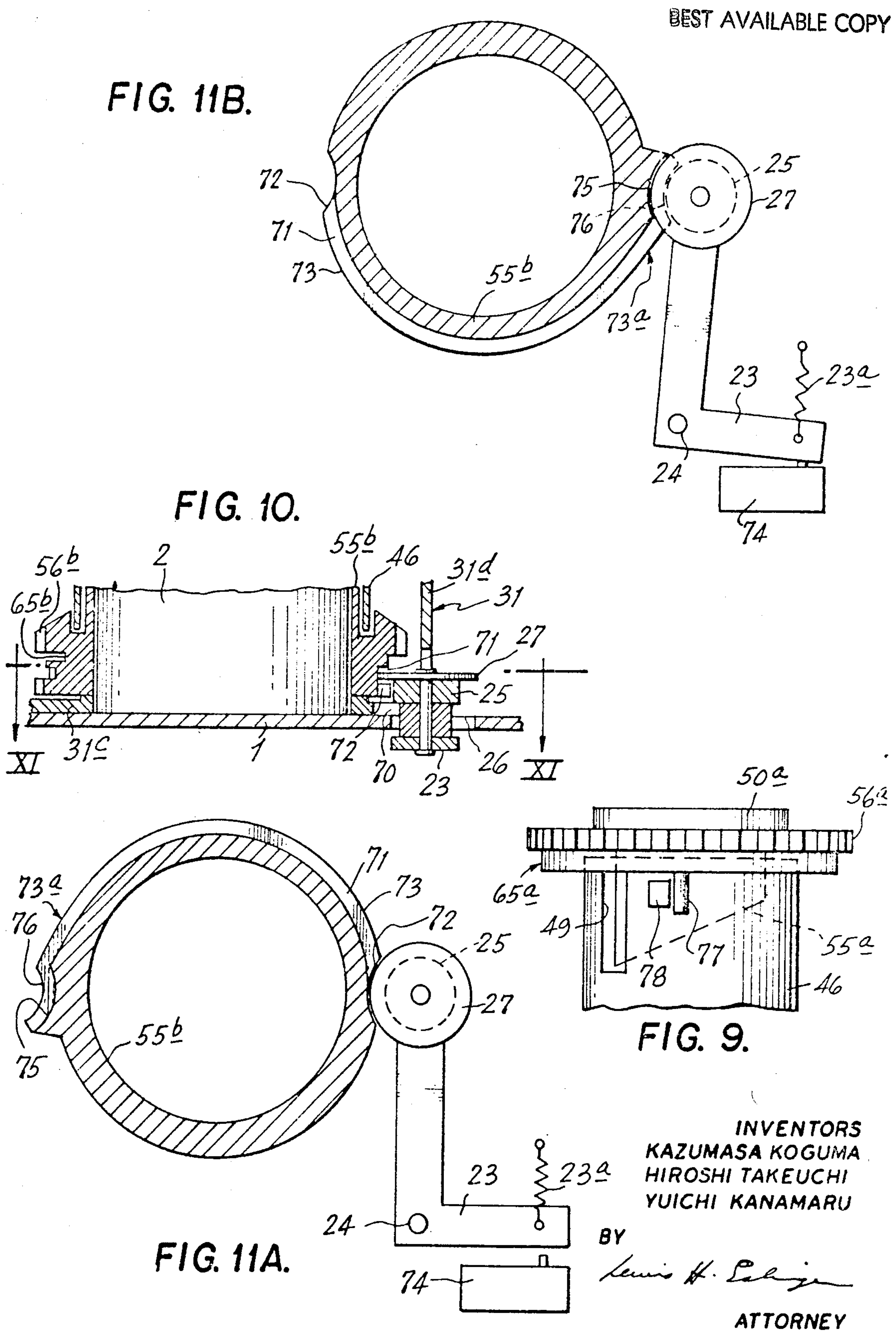
FIG. 9 is a fragmentary side elevational view of a portion of the magnetic tape cartridge.
FIG. 10 is a fragmentary sectional view illustrating the cooperative relationship of parts of the cartridge and the video tape recorder.
FIGS. 11A and 11B are detail sectional views taken along the line XI—XI on FIG. 10 and illustrating the cooperative relationship of the parts in two different relative positions thereof.

Referring now to FIG. 10, it will be seen that the front of housing 31 is provided with a cutout 70 through which roller 25 and flange 27 can reach into the housing when the latter is mounted on deck 1. The lower portion of cylindrical member 55b is formed with a semiannular groove 71 below cam 65b and, at one end of groove 71, member 55b is further formed with an arcuate cutout 72 (FIG. 11A) through which the flange or disk 27 can reach into groove 71 when the cartridge 30 is mounted on deck 1 with its members 55a and 55b in their tape supporting positions. When members 55a and 55b are turned from their tape supporting positions to their tape releasing positions, as described above, flange or disk 27 is

BEST AVAILABLE COPY retained in groove 71 so that cartridge 30 cannot be removed from deck 1 except when members 55a and 55b are returned to their tape supporting positions. During the turning of member 55b from its tape supporting position to its tape releasing position, roller 25 rides on a cam surface 73 formed on the periphery of member 55b below groove 71 and such cam surface 73 includes a radially enlarged portion 73a engaged by roller 25 when member 55b attains its tape releasing position (FIG 11B). The engagement of roller 25 with the radially enlarged cam portion 73a causes rocking of bell crank 23 from the normal position thereof (FIG. 11A), to which it is urged by a spring 23a to the displaced position of FIG. 11B where bell crank 23 engages and thereby causes closing of a normally open switch 74. The switch 74 is interposed in the circuit for energizing the motor (not shown) by which the head 3 and capstan 11 are rotated, from which it follows that rotation of head 3 and capstan 11 for driving the tape can only be effected after members 55a and 55b of the cartridge 30 mounted on deck 1 have been turned to their tape releasing positions so as to free the tape for wrapped engagement with the tape guiding drum 2 of the deck. Detents 75 and 76 are provided in groove 71 and cam surface 73 at the end of groove 71 remote from cutout 72 so as to be engaged respectively by flange 27 and roller 25 when member 55b attains its tape releasing position. Such engagement serves to limit rotation of members 55a and 55b in the direction toward their tape releasing positions, and further serves to prevent inadvertent turning of members 55a and 55b from their tape releasing positions during operation of the cartridge 30.

In order to limit the rotational movement of members 55a and 55b in the direction toward their tape supporting positions, a pin 77 depends from wall 50a of the upper member 55a outside cylindrical wall 46 and is engageable, in the tape supporting position of member 55a, with an abutment 78 projecting outwardly from wall 46 in the path of travel of pin 77 (FIGS. 6A and 9).

Referring now to FIG. 12, it will be seen that, in a modification of the described cartridge embodying this invention, the actuation of the switch 74 to permit operation of the motor for driving head 3 and capstan 11 only when members 55a and 55b are in their tape releasing positions is taken over from bell crank 23 by a lever 80 pivotally mounted, as at 83, on a post 84, for example, extending from intermediate wall 31b of the housing. One end portion 80a of lever 80 is made to extend through an opening (not shown) in cylindrical wall 46 so as to engage the outer surface of member 55a under the urging of a spring 82. So long as end portion 80a of lever 80 rides on the outer surface of member 55a, the opposite end portion 80b of the lever is held away from switch 74 which remains in its normally open condition. However, when member 55a attains its tape releasing position, end portion 80a of the lever engages in a recess or opening 81 in member 55a to permit spring 82 to rock lever 80 so that its end portion 80b actuates switch 74 and thereby causes closing of the latter to permit operation of the motor for driving head 3 and capstan 11. Alternatively, if desired, lever 80 may be employed to block the movement of pinch roller 12 against capstan 11, rather than to actuate the switch 74. In that case, pinch roller 12 can move against capstan 11, and thereby permit driving of the tape by the latter, only when end portion 80a of the lever engages in recess or opening 81 in response to turning of member 55a to its tape releasing position.

Referring now to FIG. 13, it will be seen that, in another embodiment of this invention, the previously described locating pin 29a projection above deck 1 may be replaced by a similarly protecting pin 29'a which is carried by one end of a lever 85 pivotally supported at its other end, as at 84, so that pin 29'a is laterally movable in response to rocking of lever 85 between its position shown in full lines and the position shown in broken lines at 85'. The lever 85 is yieldably urged to the position 85' by a spring 86 and, so long as lever 85 is in such position, pin 29'a does not engage locking arm 67' which replaces the previously described locking arm 67 and similarly has a pawl 67'a at one end engageable with the gear 56b on member 55b to prevent rotation of members 55a and 55b from their tape supporting positions. However, when lever 85 is rocked to the position shown in full lines, pin 29'a engages locking arm 67' to rock the latter in the direction releasing its pawl 67'a from gear 56b and thereby permit turning of members 55a and 55b.

As shown diagrammatically on FIG. 13, the video tape recorder for use with the magnetic tape cartridge according to the presently described embodiment of the invention has a control knob 13 which is turnable to various positions, for example, a stop position, a recording or playback position, a fast forward position and a rewind position. Connected with the knob 13 is a cam 88 which, when knob 13 is in its stop position, engages a pin 87 on lever 85 so as to rock the latter to its position shown in full lines. Accordingly, members 55a and 55b can be rotated only when the cartridge is mounted on the deck of the video tape recorder and the knob 13 of the latter is in its stop position. So long as the knob 13 is in any of its operating positions and, therefore, the tape is being advanced, cam 88 is removed from pin 87 so that lever 85 is displaced to its broken line position and the pawl of locking arm 67' engages gear 56b to prevent rotation of members 55a and 55b, and thereby to prevent damage to the tape.

Further, with the arrangement shown on FIG. 13, the pin 29'a can only enter the opening 34a in the bottom wall of cartridge 30 when lever 85 is in its full line position in response to knob 13 being in its stop position. Thus, the cartridge cannot be placed on the deck or panel of the video tape player if knob 13 is in any one of its operating positions.

Although several embodiments of the invention have been described in detail herein with reference to the accompanying drawings, it is to be understood that the invention is not limited to those precise embodiments, and that various changes and modifications may be effected therein by one skilled in the art without departing from the scope or spirit of the this invention.

We claim:

1. In combination with a magnetic tape recording and reproducing device having, as integral parts thereof a tape guide drum and a rotary magnetic head for recording and reproducing signals on a tape wrapped about said drum, a magnetic tape cartridge separable from said device and including a housing containing a magnetic tape, and tape engaging means located within said housing and separable therewith from said device, said tape engaging means being selectively disposable in a first position, in which said means are operative to hold said tape out of contact with said drum during mounting of said cartridge on said device and removal of the cartridge therefrom, and a second position, in which said means are operative to engage said tape with said drum wrapped relation to the latter.

2. The combination according to claim 1, in which said tape engaging means forms a loop of said tape within said housing and includes movable hollow means within which said drum extends upon mounting of said cartridge on said device, said hollow means, in said first position, being operative to support and maintain said tape loop and, in said second position, releasing said tape loop for engagement about the drum extending therein.

3. In combination with a magnetic tape recording and reproducing device having a tape guide drum and a rotary magnetic head for recording and reproducing signals on a tape wrapped about said drum, a magnetic tape cartridge separable from said device and including a housing containing a magnetic tape, and tape engaging means located within said housing and separable with said cartridge from said device, said tape engaging means forming a loop of said tape within said housing and including movable hollow means within which said drum extends upon mounting of said cartridge on said device, said hollow means being selectively disposable in a first position, in which said hollow means is operative to support and maintain said tape loop out of contact with said drum during mounting of said cartridge on said device and removal of the cartridge therefrom, and a second position, in which said hollow means releases the tape loop for engagement about the drum extending therein, said hollow means including at least one cylindrical member open at an end to permit said drum to extend therein when said housing is mounted on said device, said cylindrical member being movable between said first and second positions in which said tape loop extends around the outer surface of said cylindrical member and in which said tape loop extends within said cylindrical member, respectively.

4. The combination according to claim 3, in which said cylindrical member is rotatable between said first and second positions.

5. The combination according to claim 4, in which said hollow means includes another cylindrical member coaxially rotatable in relation to said one cylindrical member between said first and second positions and being spaced axially from said one cylindrical member so that said tape loop also extends around the outer surface of said other cylindrical member in said first position of the latter and extends within said other cylindrical member in said second position of the latter.

6. The combination according to claim 5, in which said one cylindrical member and said other cylindrical member are counterrotatable within a cylindrical wall having axially spaced entrance and exit slots through which the tape passes to cause said tape loop to form a helical turn within said cylindrical wall, said cylindrical members have parallel helical edges at their adjacent ends and axial slots opening at said end edges and each having long and short edges at the opposite sides of the slot so that the long side edges of said slots in the cylindrical members radially strip the tape loop from said drum during movement of said cylindrical members from their second positions to said first positions thereof.

7. The combination according to claim 5, further comprising means to permit mounting of said cartridge on said device and removal of said cartridge from the latter only with said cylindrical members in said first positions thereof.

8. The combination according to claim 7, further comprising locking means to prevent rotation of said cylindrical members upon removal of said cartridge from said device, and releasing means on said device operative to release said locking means in response to mounting of said cartridge on said device.

9. The combination according to claim 8, in which said tape extends between rotatable supply and takeup reels, and further comprising brake means to prevent rotation of said reels, and means on said device to release said brake means in response to mounting of said cartridge on said device.

10. The combination according to claim 8, in which said device further includes drive means for said tape and said rotary head, and means to prevent operation of said drive means except when said cylindrical members are disposed in said second positions thereof.

11. The combination according to claim 8, in which said device has an operation selecting control movable to a plurality of positions including a stop position, and means actuable with said control to render said releasing means effective to release said locking means only when said control is in said stop position thereof.

12. The combination according to claim 11, in which said means actuable with said control is further operative to permit mounting of said cartridge on said device only when said control is in said stop position.

13. In combination with a magnetic tape recording and reproducing device having a tape guide drum and a rotary magnetic head for recording and reproducing signals on a tape wrapped about said drum, a magnetic tape cartridge separable from said device and including a housing containing a magnetic tape, and tape engaging means selectively disposable in a first position, in which said means are operative to hold said tape out of contact with said drum during mounting of said cartridge on said device and removal of the cartridge therefrom, and a second position, in which said means are operative to engage said tape with said drum in wrapped relation to the latter, and means to permit mounting of said cartridge on said device and removal of said cartridge from the latter only when said tape engaging means is operative to withdraw the tape from said drum.

14. In combination with a magnetic tape recording and reproducing device having a tape guide drum and a rotary magnetic head for recording and reproducing signals on a tape wrapped about said drum, a magnetic tape cartridge separable from said device and including a housing containing a magnetic tape, and tape engaging means selectively disposable in a first position, in which said means are operative to hold said tape out of contact with said drum during mounting of said cartridge on said device and removal of the cartridge therefrom, and a second position, in which said means are operative to engage said tape with said drum in wrapped relation to the latter, locking means to prevent change in the position of said tape engaging means upon removal of said cartridge from said device, and releasing means on said device operative to release said locking means in response to mounting of said cartridge on said device.

15. The combination according to claim 14, in which said device has an operation selecting control movable to a plurality of positions including a stop position, and means actuable with said control to render said releasing means effective to release said locking means only when said control is in said stop position thereof.

16. The combination according to claim 15, in which said means actuable with said control is further operative to permit mounting of said cartridge on said device only when said control is in said stop position.

17. In combination with a magnetic tape recording and reproducing device having a tape guide drum and a rotary magnetic head for recording and reproducing signals on a tape wrapped about said drum, a magnetic tape cartridge separable from said device and including a housing containing rotatable supply and takeup reels between which a magnetic tape extends, and tape engaging means selectively disposable in a first position, in which said means are operative to hold said tape out of contact with said drum during mounting of said cartridge on said device and removal of the cartridge therefrom, and a second position, in which said means are operative to engage said tape with said drum in wrapped relation to the latter, brake means to prevent rotation of said reels, and means on said device to release said brake means in response to mounting of said cartridge on said device.

18. In combination with a magnetic tape recording and reproducing device having a tape guide drum and a rotary magnetic head for recording and reproducing signals on a tape wrapped about said drum, a magnetic tape cartridge separable from said device and including a housing containing a magnetic tape, and tape engaging means selectively disposable in a first position, in which said means are operative to hold said tape out of contact with said drum during mounting of said cartridge on said device and removal of the cartridge therefrom, and a second position, in which said means are operative to engage said tape with said drum in wrapped relation to the latter, drive means for said tape and said rotary head, and means to prevent operation of said drive means except when said tape engaging means is in said second position thereof.

19. In combination with a magnetic tape recording and reproducing device having a tape guide drum and a rotary magnetic head for recording and reproducing signals on a tape wrapped about said drum, a magnetic tape cartridge separable from said device and including a housing containing a magnetic tape, and tape engaging means selectively disposable in a first position, in which said means are operative to hold said tape out of contact with said drum during mounting of said cartridge on said device and removal of the cartridge therefrom, and a second position, in which said means are

BEST AVAILABLE COPY operative to engage said tape with said drum in wrapped relation to the latter, drive means for said tape and rotary head, latching means for securing said cartridge on said device, and means to permit operation of said drive means only when said latching means secures said cartridge on said device.

20. A magnetic tape cartridge comprising a housing containing rotatable reel means, a magnetic tape wound on said reel means and having a run free of said reel means, tape engaging means within said housing defining a cavity therein opening from said housing and adapted to receive a rotary magnetic head, said tape engaging means forming a loop in said run of the tape and including means within said cavity selectively disposable in a first position, in which said means are operative to hold said tape loop against the surface of said cavity, and in a second position, in which said means release said tape loop to free the latter from said surface of the cavity and permit engagement of the tape loop by a rotary magnetic head extending into said cavity.

21. A magnetic tape cartridge comprising a housing containing rotatable reel means, a magnetic tape wound on said reel means and having a run free of said reel means, tape engaging means defining a cavity opening from said housing and adapted to receive a rotary magnetic head, said tape engaging means forming a loop in said run of the tape and including means within said cavity selectively disposable in a first position, in which said means are operative to hold said tape loop against the surface of said cavity, and in a second position, in which said means release said tape loop so as to be engageable by a rotary magnetic head extending into said cavity, said tape engaging means including a cylindrical wall defining said cavity and having axially spaced slots through which said tape run enters and leaves said cavity so that said tape loop constitutes a helical turn, and said selectively disposable means including at least one cylindrical member turnable within said cylindrical wall with clearance therebetween, said cylindrical member having an open end with a helical edge and an axial slot opening at said edge, said tape loop extending around said cylindrical member in said first position and being released by said cylindrical member to extend within the latter in said second position of the cylindrical member.

22. A magnetic tape cartridge according to claim 21, in which said tape engaging means further includes another cylindrical member coaxially rotatable in relation to said one cylindrical member between said first and second positions and being spaced axially from said one cylindrical member so that said tape loop also extends around the outer surface of said other cylindrical member in said first position of the latter and extends within said other cylindrical member in said second position of the latter.

* * * * *